US008001866B2

(12) United States Patent
Song et al.

(10) Patent No.: US 8,001,866 B2
(45) Date of Patent: Aug. 23, 2011

(54) ELECTRONIC POWER STEERING APPARATUS

(75) Inventors: Joon Kyu Song, Seongnam-Si (KR); Seong Joo Kim, Seongnam-Si (KR); Byoung Kuk Kim, Gangnam-gu (KR)

(73) Assignee: Mando Corporation, Gyeonggi-Do (KR)

( * ) Notice: Subject to any disclaimer, the term of this patent is extended or adjusted under 35 U.S.C. 154(b) by 1057 days.

(21) Appl. No.: 11/823,741

(22) Filed: Jun. 27, 2007

(65) Prior Publication Data

US 2008/0006472 A1 Jan. 10, 2008

(30) Foreign Application Priority Data

Jul. 5, 2006 (KR) ........................ 10-2006-0062841

(51) Int. Cl.
*B62D 5/04* (2006.01)
*F16H 55/18* (2006.01)
*F16H 1/16* (2006.01)

(52) U.S. Cl. ......................... 74/409; 74/388 PS; 74/425

(58) Field of Classification Search .................... 74/409, 74/425, 440, 388 PS; 180/444
See application file for complete search history.

(56) References Cited

U.S. PATENT DOCUMENTS 2,106,088 A * 1/1938 De Tar ......................... 74/10.85
3,848,477 A * 11/1974 Giandinoto et al. ............ 74/425
4,621,933 A * 11/1986 Musso .......................... 400/555
5,528,836 A * 6/1996 Stieff ......................... 33/203.18
6,769,507 B2 * 8/2004 Murakami et al. ............ 180/444
7,188,700 B2 * 3/2007 Eda et al. ...................... 180/444
7,401,678 B2 * 7/2008 Yuasa et al. ................... 180/444
2007/0197136 A1 * 8/2007 Qi .................................. 451/11
2007/0205039 A1 * 9/2007 Imagaki et al. ............... 180/444

FOREIGN PATENT DOCUMENTS

JP 2005-88820 * 4/2005
JP 2006-214569 * 8/2006

* cited by examiner

*Primary Examiner* — William C Joyce
(74) *Attorney, Agent, or Firm* — McDermott Will & Emery LLP

(57) ABSTRACT

An electronic steering apparatus is provided. The apparatus includes a housing, a worm wheel provided in the housing, a worm axis engaged with the worm wheel in the housing, a bearing installed on the outer circumference of one side of the worm axis, and a resilient member supporting the one side while varying in its angle relative to the axial direction of the worm axis along with the movement of the worm axis, thereby providing an effect of compensating for a gap between the worm and the worm wheel.

10 Claims, 5 Drawing Sheets

303
317
301
313
311
309
314
316
327
329
315
331
307
325
305
308
319
321
323

ELECTRONIC POWER STEERING APPARATUS

RELATED APPLICATION

This application claims priority to Korean patent application No. KR2006-62841 filed on Jul. 5, 2006, the content of which is incorporated by reference.

FIELD OF THE INVENTION

The present invention relates to an electronic power steering apparatus, and more particularly to an electronic power steering apparatus capable of compensating for a gap between a worm and a worm wheel by adapting a resilient member resiliently supporting a worm axis while varying in its angle relative to an axial direction of the worm axis along with the movement of the worm axis.

BACKGROUND OF THE INVENTION

As generally known in the art, as a steering apparatus of an automobile, a hydraulic power steering apparatus using hydraulic pressure of a hydraulic pump has been used. However, an electronic steering apparatus using a motor has been widely used since 1990s.

As compared to the existing hydraulic steering apparatus in which a hydraulic pump of a power source supplying auxiliary steering power is driven by an engine so that it continuously consumes the energy irrespective of the rotation of a steering wheel, the electronic steering apparatus is configured such that upon the occurrence of a steering torque by the rotation of the steering wheel, a motor supplies the auxiliary steering power proportional to the steering torque generated. Thus, the use of the electronic steering apparatus can improve the energy efficiency relative to the use of the hydraulic steering apparatus.

FIG. 1 is a constructional view of an electronic steering apparatus according to the prior art, and FIG. 2 is a partial sectional view of the electronic steering apparatus according to the prior art.

As shown in FIGS. 1 and 2, the electronic steering apparatus generally includes a steering system 100 extending from a steering wheel 101 to both wheels 108, and an auxiliary power mechanism 120 supplying auxiliary power to the steering system 100.

The steering system 100 includes a steering shaft 102 in which an upper portion thereof is connected to the steering wheel 101 to rotate together with the same, and a lower portion thereof is connected to a pinion axis 104 by means of a pair of universal joints 103. In addition, the pinion axis 104 is connected to a rack bar 109 via a rack-pinion mechanism 105, and the rack bar 109 is connected, at both ends, to wheels 108 through a tie rod 106 and a knuckle arm 107.

The rack-pinion mechanism 105 is configured such that a pinion gear 111 provided on the lower portion of the pinion shaft 104 and a rack gear 112 provided on one side of the circumference of the rack bar 109 are engaged with each other, so that a rotational motion of the pinion shaft 104 is converted into a linear motion of the rack bar 109 through the rack-pinion mechanism 105. Thus, when a driver manipulates the steering wheel 101, the pinion shaft 104 is rotated, allowing the rack bar 109 to linearly move in an axial direction, causing the wheels 108 to be steered through the tie rod 106 and the knuckle arm 107.

The auxiliary power mechanism 120 includes a torque sensor 121 that detects a steering torque applied to the steering wheel 101 by a driver, and outputs an electric signal proportional to the detected steering torque, an electronic control unit (ECU) 123 that generates a control signal on the basis of the electric signal transmitted from the torque sensor 121, a motor 130 that generates auxiliary steering power on the basis of the control signal transmitted from the ECU 123, and a reduction device 140 having a worm 201 and a worm wheel 203 for transmitting the auxiliary steering power generated from the motor 130 to the steering shaft 102.

The reduction device 140 includes a worm axis 210 having the worm 201 at one side of the circumference thereof, and rotatably supported, at both ends, by bearings 205 and 206, wherein the worm 201 is configured to be engaged with the worm wheel 203 provided on a specified position of the circumference of the steering shaft 102, and the worm axis 210 is driven by the motor 130.

Accordingly, in the electronic steering apparatus, the steering torque generated by the rotation of the steering wheel 101 is transmitted to the rack bar 109 via the rack-pinion mechanism 105, and the auxiliary steering power generated from the motor 130 based on the steering torque generated is transmitted to the steering shaft 102 by the reduction device 140. That is, the steering torque generated from the steering system 100 and the auxiliary steering power generated from the motor 130 are combined together, allowing the rack bar 109 to move in an axial direction.

However, in the reduction device according to the prior art, the continuous steering by the driving of an automobile results in wearing in the teeth of the worm 201 and the worm wheel 203 as time goes by. In addition, since the most of the worm wheel 203 is made of synthetic resin, the worm wheel 203 is often shrunk during the cold winter season.

In such a case where the teeth of the worm 201 and the worm wheel 203 are worn out, or the worm wheel 203 is shrunk, a gap occurs between the teeth of the worm 201 and the worm wheel 203, causing a problematic backlash on a teeth engagement between the worm 201 and the worm wheel 203.

Further, the reduction device according to the prior art has a problem in that a reverse input occurs due to kick-back or the like, so that upon applying an excessive torque to the reduction device, noise is generated from gaps between the worm axis and the bearings provided at both ends thereof.

In order to solve these problems, according to the prior art, two resilient bodies are inserted into the worm axis so as to apply resilient force in a radial direction and an axial direction of the worm axis, which however causes a problem in that the number of the parts increases, and the working process becomes prolonged.

SUMMARY OF THE INVENTION

Accordingly, the present invention has been made to solve the above-mentioned problems occurring in the prior art, and the present invention provides an electronic steering apparatus capable of compensating for a gap between a worm and a worm wheel by adapting a resilient member resiliently supporting a worm axis while varying in its angle relative to an axial direction of the worm axis along with the movement of the worm axis.

In accordance with an aspect of the present invention, there is provided an electronic steering apparatus including: a housing; a worm wheel provided in the housing; a worm axis engaged with the worm wheel in the housing; a bearing installed on the outer circumference of one side of the worm axis; and a resilient member supporting the one side while varying in its angle relative to the axial direction of the worm axis along with the movement of the worm axis.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Figure 1:
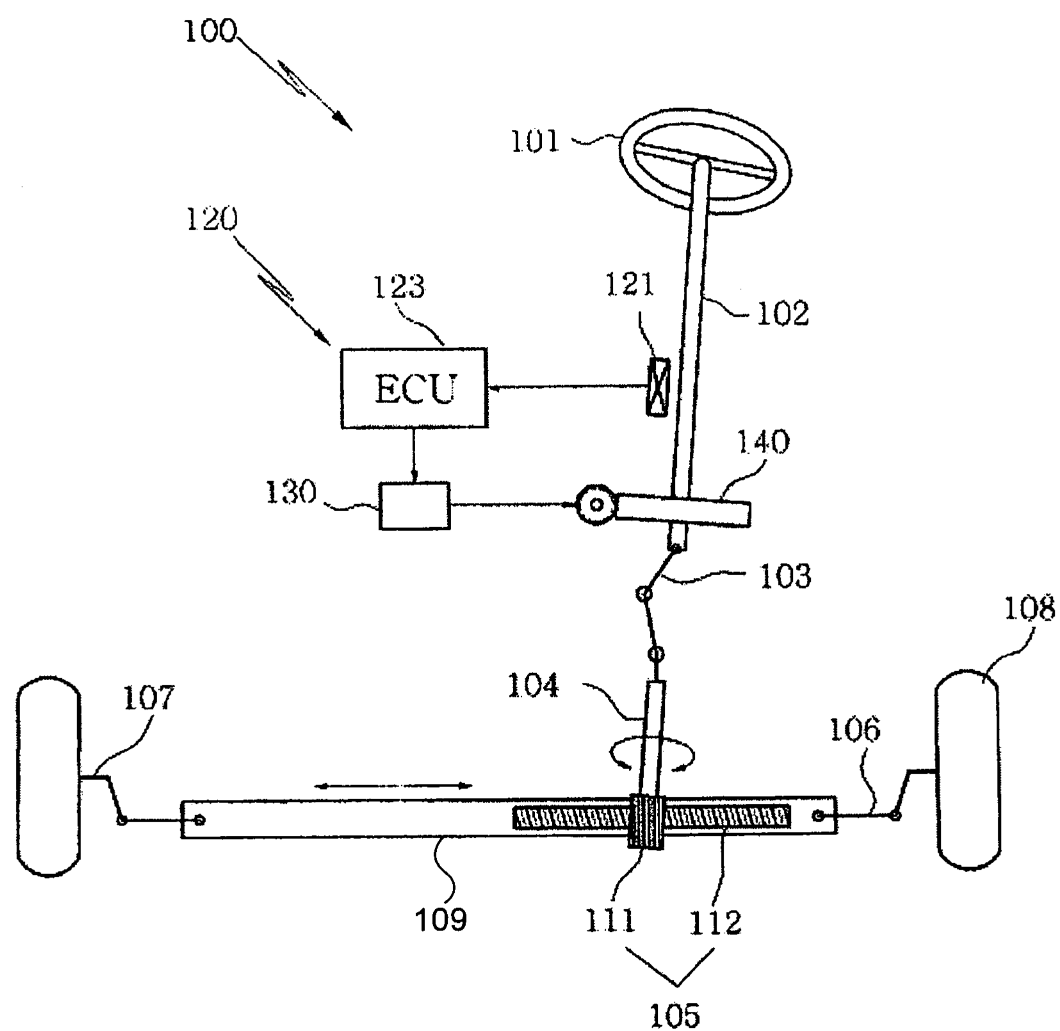
FIG. 1 is a constructional view of an electronic steering apparatus according to the prior art.
Figure 2:
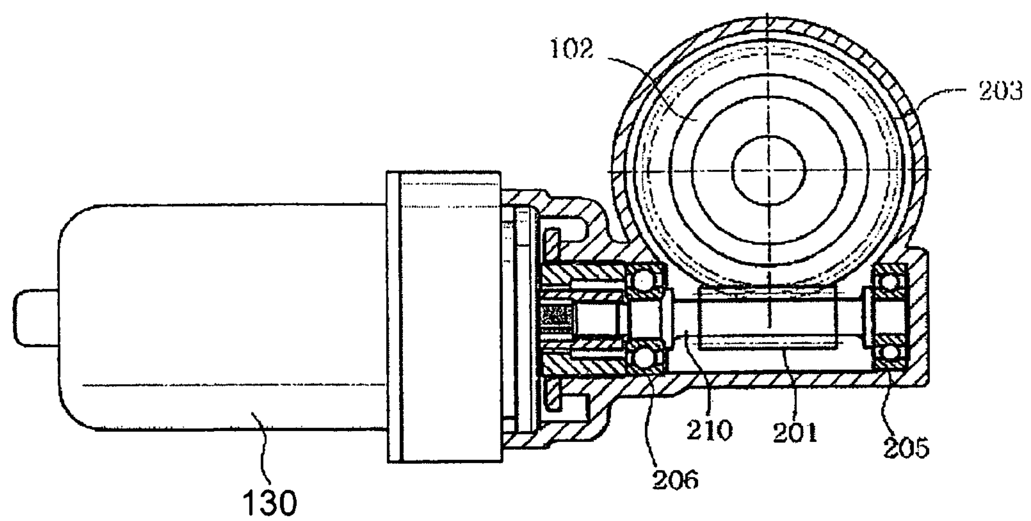
FIG. 2 is a partial sectional view of the electronic steering apparatus according to the prior art.

Hereinafter, exemplary embodiments of the present invention will be described with reference to the accompanying drawings. In the following description and drawings, the same reference numerals are used to designate the same or similar components. Further, in the following description of the present invention, a detailed description of known functions and configurations incorporated herein will be omitted when it may make the subject matter of the present invention rather unclear.

Figure 3:
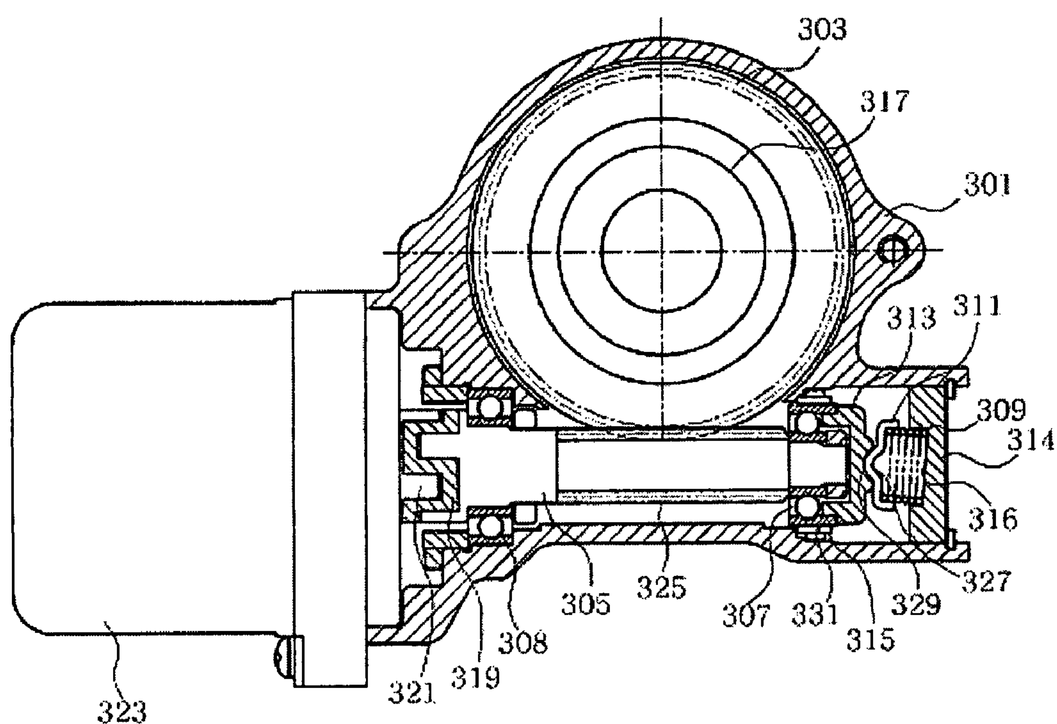
FIG. 3 is a partial sectional view of an electronic steering apparatus according to a preferred embodiment of the present invention.

FIG. 3 is a partial sectional view of an electronic steering apparatus according to a preferred embodiment of the present invention.

As shown in FIG. 3, an electronic steering apparatus includes a housing 301, a worm wheel 303 provided in the housing 301, a worm axis 305 engaged with the worm wheel 303 in the housing 301, a first bearing 307 installed on the circumference of the worm axis 305, a resilient member 309 supporting the worm axis 305, a first support 311 provided at one end of the resilient member 309, a second support 313 contacting the first support 311, a fixing member 314 provided at the other end of the resilient member 309, and a buffer member 315 separated from the bearing 307 and provided on the inner circumference of the housing 301.

The housing 301 covers the worm wheel 303 and the worm axis 305, and may be divided into two parts, one part covering the worm wheel 303, and the other part covering the worm axis 305.

The worm wheel 303 is formed on the outer circumference of a steering shaft 317, and receives power through being engaged with the worm axis 305.

The worm axis 305 is flexibly connected, at its one end, to a motor axis 321 by a flexible coupling 319, rotating by a motor 323. A second bearing 308 is provided on the outer circumference of one side of the worm axis 305, so that the worm axis 305 is able to not only rotate smoothly, but also be tilted at a certain angle relative to the axial direction of the worm axis 305.

In addition, a worm 325 to be engaged with the worm wheel 303 is formed on the outer circumference of the worm axis 305, so that upon rotation of the worm axis 305, it is engaged with the worm wheel 303, supplying auxiliary steering power to the steering shaft 317.

The first bearing 307 is provided on the other end of the worm axis 305 to support the rotation of the worm axis 305.

The resilient member 309 applies resilient force to the worm axis 305 in an inclined direction relative to the axial direction of the worm axis 305. As the resilient member 309, a compression spring can be used, but the resilient member is not limited thereto.

The first support 311 is provided on one end of the resilient member 309, and is provided, on one side of the outer circumference, with a protrusion 327, which is preferably round-shaped, such as a spherical shape or an oval shape.

The second support 313 has opposite sides, one side being provided with a recess 329, in which the protrusion 327 is inserted, the other side contacting the first bearing 307. The recess 329 is preferably shaped round in an inner direction so as to receive the protrusion 327 therein. Meanwhile, the second support 313 may be formed such that the other side thereof contacts an outer ring 331 of the first bearing 307.

The fixing member 314 supports the other end of the resilient member 309. Here, the fixing member is provided with an inclined groove 316 on which the other end of the resilient member 309 is seated, so that the resilient member 309 can apply resilient force to the worm axis 305 while being inclined relative to the axial direction of the worm axis 305.

Meanwhile, the fixing member 314 contacts the inner circumference of the housing 301, and in case where it rotates relative to the housing 301, a change occurs in a direction to which the resilient force of the resilient member 309 is applied, so that there is a need to support the fixing member 314 relative to the housing 301.

Figure 4:
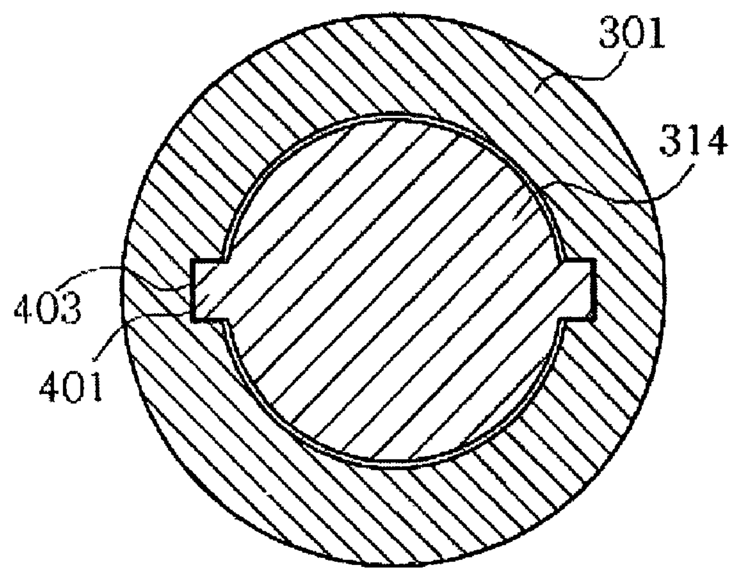
FIG. 4 is a partial sectional view of an anti-rotation structure according to the present invention.

FIG. 4 is a partial sectional view of an anti-rotation structure according to the present invention.

As shown in FIG. 4, an engaging protrusion 401 is provided on the outer circumference of the fixing member 314, and an engaging groove 403 is formed on the housing 301 to receive the engaging protrusion 401 therein, so that when the fixing member 314 tries to rotate relative to the housing 301, the engaging protrusion 401 is restricted by the engaging groove 403, thereby fixing the position of the fixing member 314. Meanwhile, the engaging protrusion 401 and the engaging groove 403 can be formed on the housing 301 and the fixing member 314, respectively.

Figure 5:
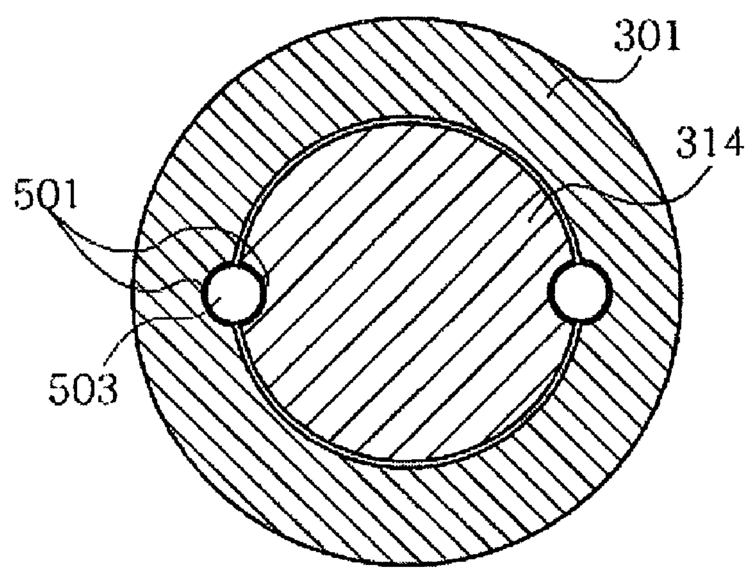
FIG. 5 is a partial sectional view of another anti-rotation structure according to the present invention.

FIG. 5 is a partial sectional view of another anti-rotation structure according to the present invention.

As shown in FIG. 5, an anti-rotation hole 501 is formed on the outer circumferences, respectively, of the fixing member 314 and the housing 301, and a spring pin 503 is provided in the anti-rotation hole 501, so that the spring pin 503 applies resilient force to the fixing member 314 and the housing 301, respectively, rendering the fixing member 314 fixed relative to the housing 301 without movement.

According to the preferred embodiment of the present invention having the above constructions, the resilient force of the resilient member 309 is transferred to the recess 329 of the second support 313 via the protrusion 327 of the first support 311, then is transferred to the outer ring 331 of the first bearing 307 by the second support 313, and finally transferred to the worm axis 305.

If needed, it may be configured such that a third support (not shown) identical to the first support 311 is provided on the other end of the resilient member 309, and a recess (not shown) receiving a protrusion (not shown) of the third support is provided on the fixing member 314.

Meanwhile, the resilient force of the resilient member 309 acts inclined to the axial direction of the worm axis 305, and is decomposed into an axial component force and a radial component force.

Since the axial force is also transferred to the second bearing 308 contacting the outer circumference of the worm axis 305, upon driving the worm axis 305, it reduces impact noise occurring when the second bearing 308 comes into contact with the outer circumference of the housing 301 or the worm axis 305.

The radial force pushes the worm axis 305 toward the worm wheel 303, compensating for the gap between the worm wheel 303 and the worm axis 305.

The buffer member 315 is provided on an inner circumference of the housing 301 so as to be separated from the first bearing 307, and provides a shock-absorbing function relative to the bearing 307 when the worm axis 305 moves at a certain angle relative to the axial direction thereof.

Figure 6:
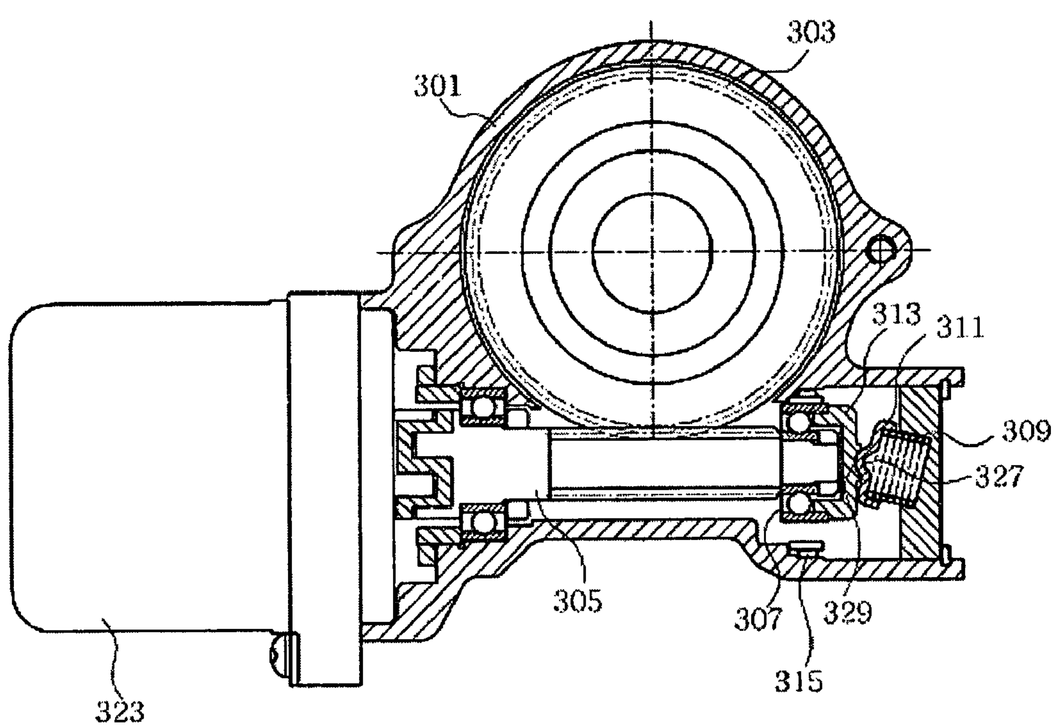
FIG. 6 is a partial sectional view showing the state where a worm axis is shifted in the direction of a worm wheel.

FIG. 6 is a partial sectional view showing the state where the worm axis is shifted in the direction of the worm wheel.

As shown in FIG. 6, in case where the worm wheel 303 is shrunk by a decrease in an ambient temperature, wearing of the gear teeth or the like, a gap may occur between the worm wheel 303 and the worm axis 305. In this case, the worm axis 305 is shifted toward the worm wheel 303 by the radial force applied in a diameter direction of the worm axis 305 in the resilient force of the resilient member 309, thereby compensating for the gap.

In addition, in this case, the protrusion 327 of the first support 311 and the recess 329 of the second support 313 are shaped like a sphere or others, so that the worm axis 305 and the resilient member 309 can be moved smoothly.

Furthermore, in this case, the buffer member 315 positioned on the worm wheel 303 side absorbs shocks occurring when the first bearing 307 comes into contact with the worm wheel, thereby reducing shocks to be transferred to the housing 301.

As set forth before, according to the present invention, the resilient member is provided to resiliently support the worm axis while varying in its angle relative to the axial direction of the worm axis along with the movement of the worm axis, providing an effect of compensating for a gap between the worm and the worm wheel.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An electronic power steering apparatus comprising:

a housing;

a worm wheel provided in the housing;

a worm shaft having a worm formed on an outer circumference of the worm shaft, said worm engaged with the worm wheel in the housing;

a bearing installed on the outer circumference of one side of the worm shaft;

a resilient member supporting the one side;

a fixing member having an inclined groove on which a first end of the resilient member is seated so that an axis of said resilient member forms an oblique angle with an axis of said worm shaft; and a first support provided on a second end of the resilient member, and a second support having opposite ends, one end contacting the first support, the other end contacting an outer ring of the bearing.

2. The electronic power steering apparatus as claimed in claim 1, wherein the first support is provided with a protrusion, and the second support is provided, at said one end, with a recess receiving the protrusion therein.

3. The electronic power steering apparatus as claimed in claim 1, further comprising a buffer member provided on an inner circumference of the housing so as to be separable from the bearing.

4. The electronic power steering apparatus as claimed in claim 1, wherein an anti-rotation structure is provided on the outer circumference of the fixing member and the inner circumference of the housing.

5. The electronic power steering apparatus as claimed in claim 4, wherein the anti-rotation structure includes an engaging protrusion and an engaging groove receiving the engaging protrusion therein.

6. The electronic power steering apparatus as claimed in claim 4, wherein the anti-rotation structure includes anti-rotation grooves provided on the outer circumference of the fixing member and the inner circumference of the housing, respectively, and spring pins inserted into the anti-rotation grooves.

7. The electronic power steering apparatus as claimed in claim 1, wherein the resilient member is arranged within said housing.

8. The electronic power steering apparatus as claimed in claim 1, further comprising a second bearing installed on the outer circumference of the other side of the worm shaft.

9. The electronic power steering apparatus as claimed in claim 1, further comprising a motor connected to the other side of the worm shaft.

10. An electronic power steering apparatus comprising:

a housing;

a worm wheel provided in the housing;

a worm shaft having a worm formed on an outer circumference of the worm shaft, said worm engaged with the worm wheel in the housing;

a bearing installed on the outer circumference of one side of the worm shaft;

a resilient member supporting the one side; and a first support provided on one end of the resilient member, and a second support having opposite ends, one end contacting the first support, the other end contacting an outer ring of the bearing, wherein the first support is provided with a protrusion, and the second support is provided, at said one end, with a recess receiving the protrusion therein, and an axis of said resilient member forms an oblique angle with an axis of said worm shaft.

* * * * *